(12) United States Patent
Kawamoto

(10) Patent No.: US 12,362,436 B2
(45) Date of Patent: Jul. 15, 2025

(54) POWER STORAGE DEVICE

(71) Applicant: TOYOTA JIDOSHA KABUSHIKI KAISHA, Toyota (JP)

(72) Inventor: Naoya Kawamoto, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 581 days.

(21) Appl. No.: 17/864,016

(22) Filed: Jul. 13, 2022

(65) Prior Publication Data
US 2023/0018358 A1   Jan. 19, 2023

(30) Foreign Application Priority Data
Jul. 19, 2021 (JP) .................................. 2021-118683

(51) Int. Cl.
*H01M 50/50* (2021.01)
*H01M 50/249* (2021.01)
*H01M 50/296* (2021.01)
*H01M 50/507* (2021.01)
*H01M 50/516* (2021.01)

(52) U.S. Cl.
CPC ....... *H01M 50/507* (2021.01); *H01M 50/249* (2021.01); *H01M 50/296* (2021.01); *H01M 50/516* (2021.01); *H01M 2220/20* (2013.01)

(58) Field of Classification Search
None
See application file for complete search history.

(56) References Cited

U.S. PATENT DOCUMENTS

2020/0076022 A1* 3/2020 Kawakami .......... H01M 50/581

FOREIGN PATENT DOCUMENTS

| JP | H11-102680 A | 4/1999 |
|---|---|---|
| JP | 2012-084319 A | 4/2012 |

* cited by examiner

*Primary Examiner* — Wyatt P McConnell
(74) *Attorney, Agent, or Firm* — Dinsmore & Shohl LLP

(57) ABSTRACT

A power storage device comprises: a plurality of power storage cells that are aligned in an alignment direction; an accommodation case that includes an upper case and a lower case and accommodates the plurality of power storage cells; a bus bar module that electrically connects the plurality of power storage cells together; and a cover that is disposed between the upper case and the bus bar module such that a portion of the upper case can abut thereon, the plurality of power storage cells being fixed to the lower case, the bus bar module including a plurality of bus bars that connect the external terminals of the power storage cells adjacent to one another in the alignment direction, the cover including a facing portion that faces the plurality of bus bars, the facing portion being provided with a projection that abuts on the bus bar.

2 Claims, 3 Drawing Sheets

POWER STORAGE DEVICE

This nonprovisional application is based on Japanese Patent Application No. 2021-118683 filed on Jul. 19, 2021 with the Japan Patent Office, the entire contents of which are hereby incorporated by reference.

BACKGROUND

Field

The present disclosure relates to a power storage device mounted on a vehicle.

Description of the Background Art

Japanese Patent Application Laying-Open No. 2012-084319 discloses as a power storage module mounted on a conventional vehicle a power storage module comprising a battery pack (or a power storage stack) composed of a plurality of aligned storage batteries with a bus bar module assembled thereto. The bus bar module includes a bus bar and a bus bar accommodating portion configured by a plurality of enclosures opened upward and downward.

SUMMARY

In recent years, a power storage device having the above power storage module accommodated in a case is required to have a large capacity, and the power storage module accommodated in the case is also increased in size. Accordingly, the power storage device may externally receive an impact, and, for example, an upper case may receive a downward impact. In this case, the upper case may be damaged if it unsuccessfully disperses the received impact.

The present disclosure has been made in view of the above issue, and an object of the present disclosure is to provide a power storage device capable of suppressing damage to an upper case when the upper case externally receives an impact.

A power storage device according to the present disclosure comprises: a plurality of power storage cells that each include an external terminal and are aligned in an alignment direction; an accommodation case that includes an upper case and a lower case and accommodates the plurality of power storage cells; a bus bar module that electrically connects the plurality of power storage cells together; and a cover that is disposed between the upper case and the bus bar module such that a portion of the upper case can abut thereon. The plurality of power storage cells are fixed to the lower case. The bus bar module includes a plurality of bus bars that connect the external terminals of the power storage cells adjacent to one another in the alignment direction. The cover includes a facing portion that faces the plurality of bus bars. The facing portion is provided with a projection that abuts on the bus bar.

According to the above configuration, when a downward impact is received by the upper case, a portion of the impact is transmitted to the cover through a portion of the upper case that abuts on the cover. The projection provided on the facing portion of the cover facing the plurality of bus bars abuts on the bus bar, and the portion of the impact is transmitted to the power storage cell through the projection, the bus bar, and the external terminal. The power storage cell is fixed to the lower case, and the impact transmitted to the power storage cell is transmitted to the lower case via the fixed portion. In this manner, the impact received by the upper case can be transmitted to the lower case while being dispersed. This can suppress damage to the upper case.

In the disclosed power storage device, the bus bar may have a welded portion welded to the external terminal. In some embodiments, the projection may be in contact with the bus bar away from the welded portion.

According to the above configuration, the projection is in contact with the bus bar away from the welded portion, which can suppress direct input of an impact from the upper case to the welded portion. This can suppress breakage of the welded portion and maintain steady connection between the bus bar and the external terminal.

In the disclosed power storage device, the bus bar may include a plate-shaped portion that has a first surface and a second surface in a relationship with one serving as a front surface and the other serving as a back surface, and that is placed on the external terminal. In this case, the second surface is placed on the external terminal, and the first surface faces away from the external terminal. The first surface may be provided with a recess recessed toward the second surface, and the recess may have a bottom portion provided with the welded portion. Further, the projection may have a flat surface portion coming into contact with the first surface. The flat surface portion may be in contact with the first surface such that the flat surface portion straddles the recess to avoid coming into contact with the welded portion.

According to the above configuration, the flat surface portion provided at an end of the projection comes into contact with the first surface of the plate-shaped portion of the bus bar, and a load input from the projection and received by the bus bar can be dispersed in a direction along a plane. This can suppress deformation of the bus bar and also suppress a load imposed on the external terminal.

Further, providing the welded portion in the recess provided on the first surface of the plate-shaped portion allows the welded portion to be formed in a significantly wide range. In this case, the projection having the flat surface portion in contact with the first surface while straddling the recess can suppress direct input of an impact from the upper case to the welded portion while allowing the welded portion to be formed over a wide range.

In the disclosed power storage device, the projection may have a lightening portion.

According to the above configuration, providing the projection with the lightening portion allows the projection to be stabilized in shape when the power storage device is manufactured. This allows a load transmitted from the upper case to be uniformly dispersed within the projection. Further, when providing the lightening portion is compared with forming the projection with the same volume without providing the lightening portion, the former allows the projection to have a larger external shape in a direction of a plane, and can disperse a load transmitted from the upper case.

In the disclosed power storage device, the cover includes an upper surface portion that faces away from the bus bar and allows the portion of the upper case to abut thereon. In this case, the upper surface portion may be flat.

This configuration allows a load transmitted from the upper case to the cover to be dispersed more uniformly.

The foregoing and other objects, features, aspects and advantages of the present disclosure will become more apparent from the following detailed description of the present disclosure when taken in conjunction with the accompanying drawings.

DESCRIPTION OF THE EMBODIMENTS

Hereinafter, embodiments of the present disclosure will be described in detail with reference to the drawings. In the following embodiment, any identical or common component is identically denoted and will not be described redundantly.

Figure 1:
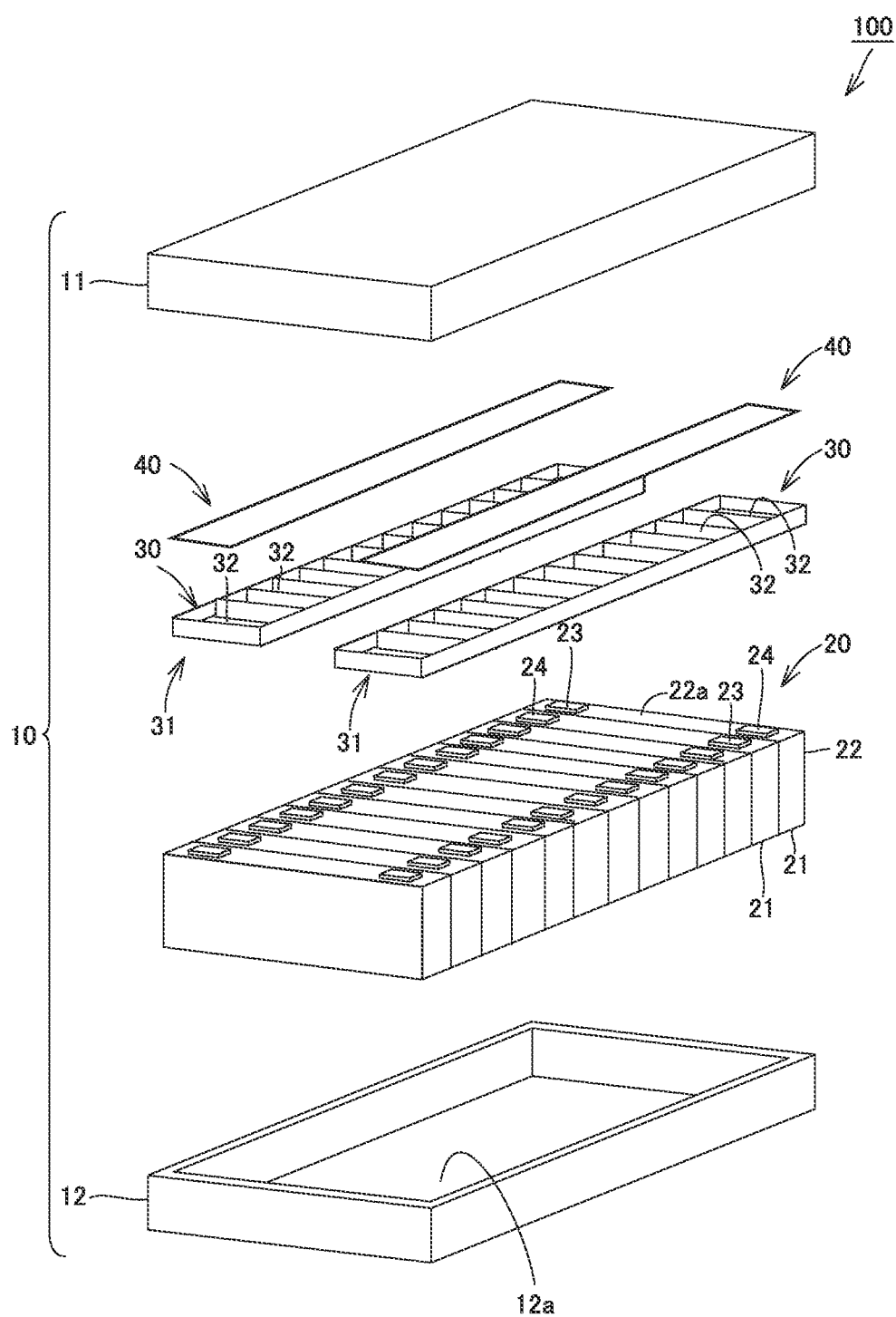
FIG. 1 is an exploded perspective view of a power storage device according to an embodiment.
Figure 2:
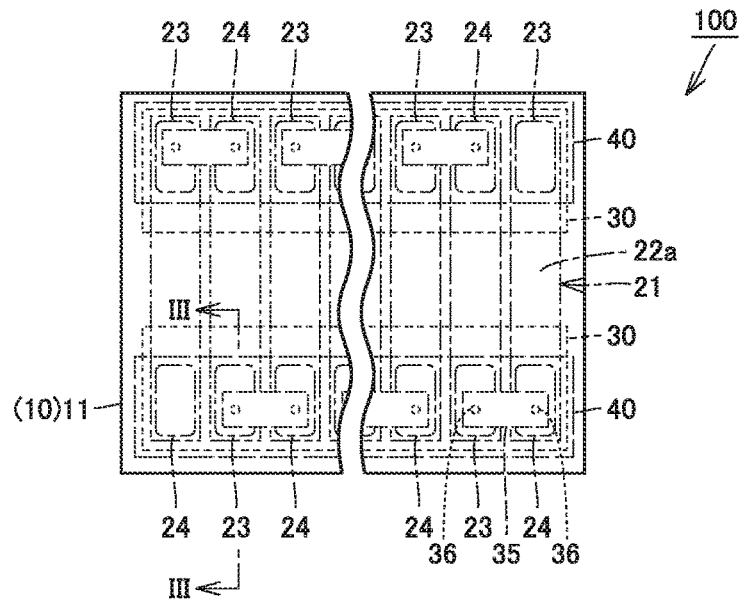
FIG. 2 is a top view of the power storage device according to the embodiment.

FIG. 1 is an exploded perspective view of a power storage device according to an embodiment. FIG. 2 is a top view of the power storage device according to the embodiment. A power storage device 100 according to an embodiment will be described with reference to FIGS. 1 and 2.

Power storage device 100 according to the embodiment is mounted on a hybrid electric vehicle that can travel by using power of at least one of a motor and an engine, or an electrically powered vehicle that travels by a driving force obtained from electric energy. Power storage device 100 may be mounted below a floor panel of the vehicle, or may be disposed between the floor panel and a seat.

As shown in FIGS. 1 and 2, power storage device 100 according to the embodiment includes an accommodation case 10, a power storage stack 20, a bus bar module 30, and a cover 40.

Accommodation case 10 accommodates power storage stack 20, bus bar module 30, and cover 40 therein. Accommodation case 10 includes an upper case 11 and a lower case 12. Upper case 11 is generally in the form of a box which opens downward. Lower case 12 is generally in the form of a box which opens upward.

Power storage stack 20 includes a plurality of power storage cells 21 aligned in a predetermined alignment direction. The plurality of power storage cells 21 are fixed to a bottom 12a of the lower case 12 by a fixture such as a bracket (not shown).

Power storage cell 21 is, for example, a secondary battery such as a nickel metal hydride battery or a lithium ion battery. The unit cell has, for example, a rectangular shape. The secondary battery may use either a liquid electrolyte or a solid electrolyte. The power storage cell may be a unit capacitor configured to be capable of storing electric power.

Figure 3:
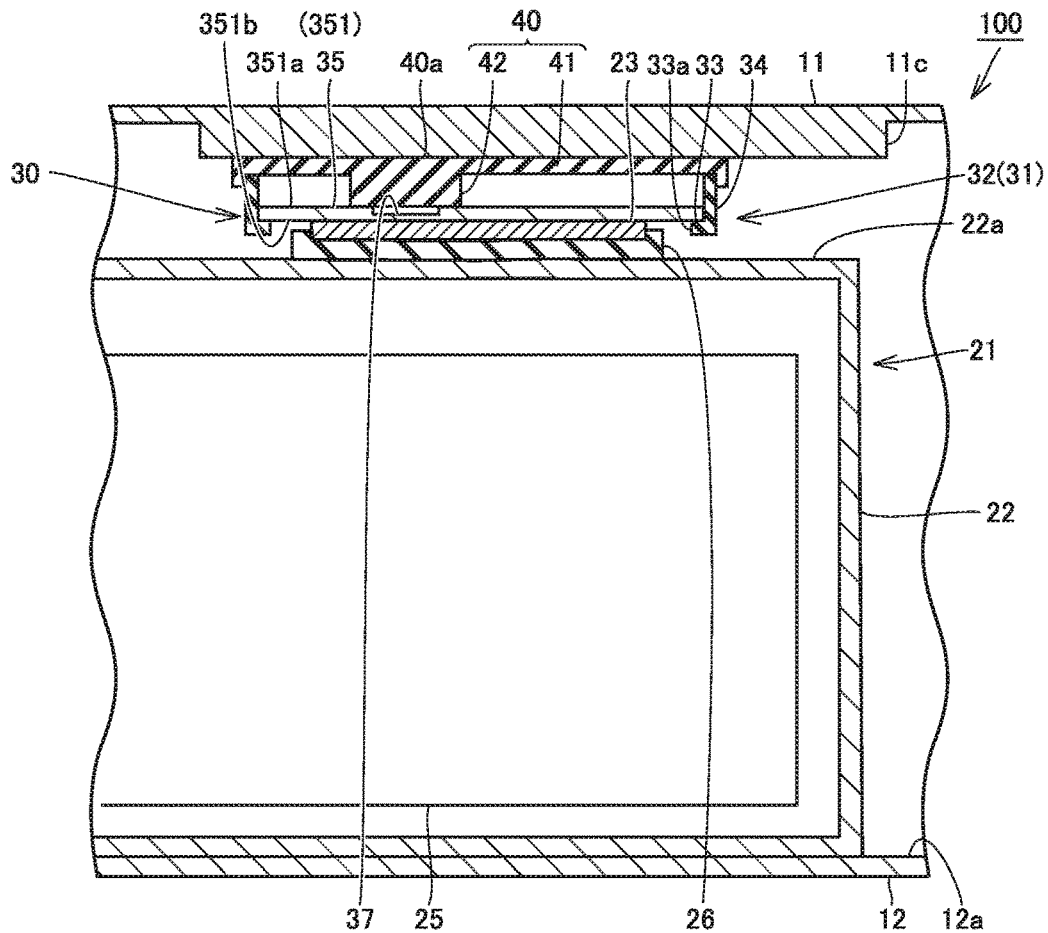
FIG. 3 is a cross section of the power storage device taken along a line III-III shown in FIG. 2.

Power storage cell 21 includes a casing 22, a positive electrode terminal 23 and a negative electrode terminal 24 as external terminals, and a battery element 25 (see FIG. 3). Casing 22 has a rectangular shape. Positive electrode terminal 23 and negative electrode terminal 24 are provided on an upper surface portion 22a of casing 22. Positive electrode terminal 23 and negative electrode terminal 24 are electrically insulated from casing 22 by an insulator 26 (see FIG. 3).

Casing 22 accommodates battery element 25 therein. Positive electrode terminal 23 is connected to a positive electrode of battery element 25 by a conductive member (not shown). Negative electrode terminal 24 is connected to a negative electrode of battery element 25 by a conductive member (not shown).

The plurality of power storage cells 21 are each aligned to have a side surface largest in area facing one another. The plurality of power storage cells 21 are aligned such that positive electrode terminal 23 and negative electrode terminal 24 are alternately aligned in the alignment direction.

Bus bar module 30 is a module for electrically connecting the plurality of power storage cells 21. Bus bar module 30 is disposed above power storage stack 20. Bus bar module 30 is disposed on power storage cell 21 at opposite end sides in a widthwise direction orthogonal to the alignment direction. Bus bar module 30 includes a bus bar holder 31 and a plurality of bus bars 35.

Bus bar holder 31 holds the plurality of bus bars 35. Bus bar holder 31 is provided such that a plurality of bus bar accommodating portions 32 are successively provided in the alignment direction. Bus bar holder 31 is made of an insulating resin member.

The plurality of bus bars 35 connect the external terminals of power storage cells 21 adjacent to each other in the alignment direction. Specifically, the plurality of bus bars 35 connect positive electrode terminal 23 and negative electrode terminal 24 adjacent to each other in the alignment direction at the opposite end sides as seen in a widthwise direction. The plurality of power storage cells 21 are thus connected in series.

Bus bar 35 is formed of a metal member. Bus bar 35 is welded and thus connected to positive electrode terminal 23 and negative electrode terminal 24. That is, bus bar 35 has a welded portion 36 welded to positive electrode terminal 23 and negative electrode terminal 24.

Cover 40 is disposed between upper case 11 and bus bar module 30 so that a portion of upper case 11 can abut cover 40. Cover 40 is provided so as to cover bus bar holder 31. Cover 40 is provided so as to extend in the alignment direction. Cover 40 is formed of a resin member.

Figure 4:
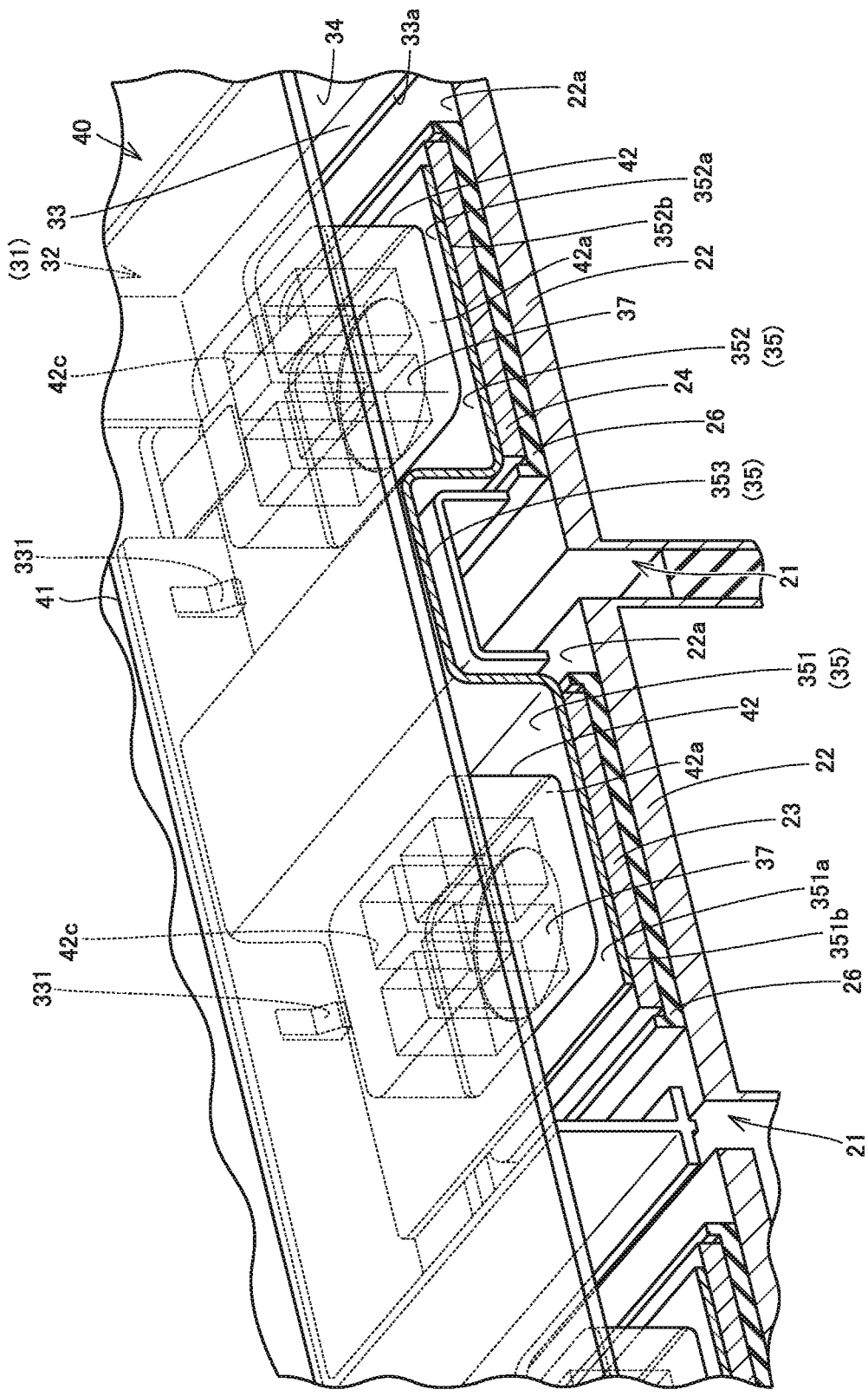
FIG. 4 is a perspective cross section partially showing a cover, a bus bar module, and a plurality of power storage cells included in the power storage device according to the embodiment.

FIG. 3 is a cross section of the power storage device taken along a line III-III shown in FIG. 2. FIG. 4 is a perspective cross section partially showing the cover, the bus bar module, and the plurality of power storage cells included in the power storage device according to the embodiment. Cover 40, bus bar module 30, power storage cell 21, and the like will be described in detail with reference to FIGS. 3 and 4.

For the sake of convenience, FIGS. 3 and 4 only show one side of power storage cell 21 in the widthwise direction. Cover 40, bus bar module 30, and power storage cell 21 on the other side of power storage cell 21 in the widthwise direction are substantially the same in configuration as those on one side thereof, and accordingly, they will be described in configuration on one side in the widthwise direction.

Bus bar holder 31 has bus bar accommodating portion 32 generally in the form of a box. Bus bar accommodating portion 32 has a bottom portion 33 and a peripheral wall portion 34. Bottom portion 33 is provided with an opening 33a. Peripheral wall portion 34 erects from a peripheral edge of bottom portion 33. Bottom portion 33 receives a portion of the peripheral edge of bus bar 35. Peripheral wall portion 34 has an internal wall provided with an engagement 331. Engagement 331 engages with the portion of the peripheral edge of bus bar 35 that is received on bottom portion 33.

Positive electrode terminal 23 and negative electrode terminal 24 are generally in the form of a flat plate and are disposed in opening 33a of bus bar accommodating portion 32. Positive electrode terminal 23 and negative electrode terminal 24 are electrically insulated from casing 22 by insulator 26.

Bus bar 35 includes a first plate-shaped portion 351 and a second plate-shaped portion 352 as a plate-shaped portion, and a connecting portion 353. First plate-shaped portion 351 constitutes the side of a first end portion of bus bar 35 located on one side in the alignment direction. Second plate-shaped portion 352 constitutes the side a second end portion of bus bar 35 located on the other side in the alignment direction. Connecting portion 353 interconnects first and second plate-shaped portions 351 and 352. Connecting portion 353 is provided so as to protrude upward.

On one side of power storage cell 21 in the widthwise direction, first plate-shaped portion 351 is placed on positive electrode terminal 23, and second plate-shaped portion 352 is placed on negative electrode terminal 24.

First plate-shaped portion 351 has a first surface 351a and a second surface 351b which have a relationship with one serving as a front surface and the other serving as a back surface. First surface 351a faces away from positive electrode terminal 23. Second surface 351b is placed on positive electrode terminal 23.

First surface 351a is provided with a recess 37 recessed toward second surface 351b. Recess 37 has a bottom portion provided with welded portion 36 welded to positive electrode terminal 23.

Similarly, second plate-shaped portion 352 has a first surface 352a and a second surface 352b which have a relationship with one serving as a front surface and the other serving as a back surface. First surface 352a faces away from negative electrode terminal 24. Second surface 351b is placed on negative electrode terminal 24. First surface 352a is flush with first surface 351a, and second surface 352b is flush with second surface 351b.

First surface 352a is provided with recess 37 recessed toward second surface 352b. Recess 37 has a bottom portion provided with welded portion 36 welded to negative electrode terminal 24.

Upper case 11 has an internal surface provided with a protrusion 11c protruding downward. Protrusion 11c functions as a load transmitting portion for transmitting a load to cover 40 when upper case 11 receives a downward impact. Protrusion 11c has a bottom surface formed flat.

Cover 40 has an upper surface portion 40a. Upper surface portion 40a faces away from bus bar 35. That is, upper surface portion 40a faces upward. Upper surface portion 40a allows a portion of upper case 11, or protrusion 11c, to abut thereon. Specifically, protrusion 11c may be provided so as to constantly abut on upper surface portion 40a, or protrusion 11c may abut on upper surface portion 40a when upper case 11 is pressed downward as upper case 11 receives a downward impact.

Upper surface portion 40a is formed flat. Thus, when upper case 11 receives a downward impact, a load received by upper surface portion 40a can be uniformly dispersed to cover 40 via protrusion 11c.

Cover 40 includes a facing portion 41. Facing portion 41 extends in the alignment direction. Facing portion 41 is located above and faces the plurality of bus bars 35. Facing portion 41 is provided with a plurality of projections 42. The plurality of projections 42 are each provided at a position corresponding to an external terminal of power storage cell 21. The plurality of projections 42 project downward.

Projection 42 is provided so as to abut on bus bar 35. Specifically, projection 42 abuts on the plate-shaped portion of bus bar 35. More specifically, projection 42 abuts on one of first and second plate-shaped portions 351 and 352.

Further, projection 42 abuts on bus bar 35 away from welded portion 36. Therefore, when upper case 11 receives a downward impact as described above, the impact can be prevented from being directly received by welded portion 36 via projection 42. This can suppress breakage of welded portion 36 and maintain steady connection between bus bar 35 and the external terminal.

Projection 42 is generally in the form of a block. Projection 42 has a lightening portion 42c. Cover 40 including projection 42 is formed of a resin member in one piece by injection molding, for example. In manufacturing cover 40, providing lightening portion 42c allows projection 42 to be stabilized in shape. This allows a load transmitted from upper case 11 to be uniformly dispersed within projection 42. Further, when providing lightening portion 42c is compared with forming projection 42 with the same volume without providing lightening portion 42c, the former allows projection 42 to have a larger external shape in a direction of a plane, and can sufficiently disperse a load transmitted from upper case 11.

Projection 42 has a flat surface portion 42a which abuts on the first surface of the plate-shaped portion. Specifically, when projection 42 abuts on first plate-shaped portion 351, flat surface portion 42a abuts on first surface 351a. When projection 42 abuts on second plate-shaped portion 352, flat surface portion 42a abuts on first surface 352a.

Note that flat surface portion 42a is in contact with the first surface such that the flat surface portion 42a straddles recess 37 and thus avoids coming into contact with welded portion 36. This allows a load transmitted from projection 42 and received by bus bar 35 to be dispersed in a direction of a plane. This can suppress deformation of bus bar 35 and also suppress a load imposed on the external terminal. Further, as flat surface portion 42a straddles recess 37, welded portion 36 can be formed in a wide range.

As described above, power storage device 100 according to the embodiment has a configuration in which cover 40 is disposed between bus bar module 30 and upper case 11 so that a portion of upper case 11 can abut on cover 40, and projection 42 that abuts on bus bar 35 is provided at facing portion 41 of cover 40 that faces the plurality of bus bars 35.

When a downward impact is received by upper case 11, a portion of the impact is transmitted to the cover through a portion of upper case 11 that abuts on cover 40 (specifically, protrusion 11c). Projection 42 provided on facing portion 41 of cover 40 abuts on bus bar 35, and the portion of the impact can be transmitted to power storage cell 21 through projection 42, bus bar 35, and the external terminal. Power storage cell 21 is fixed to lower case 12, as described above, and the impact transmitted to power storage cell 21 is transmitted to lower case 12 via the fixed portion. In this manner, the impact received by upper case 11 can be transmitted to lower case 12 while being dispersed. This can suppress damage to upper case 11.

OTHER MODIFIED EXAMPLES

While in the above-described embodiment, bus bar 35 has recess 37 and welded portion 36 is provided at the bottom of recess 37 for the sake of illustration, recess 37 may be dispensed with and welded portion 36 may be provided at a different location. In this case, projection 42 (more specifically, flat surface portion 42a) abuts on bus bar 35 away from welded portion 36 at a position where projection 42 does not overlap welded portion 36 in the vertical direction.

Further, while bus bar 35 has been described to have first and second plate-shaped portions 351 and 352 connected by connecting portion 353 protruding upward for the sake of illustration, bus bar 35 is not limited to this in shape. Bus bar 35 may be in the form of a flat plate with first and second plate-shaped portions 351 and 352 connected flat.

While in the above-described embodiment a plurality of projections 42 are provided to each correspond to one of a plurality of external terminals for the sake of illustration, the number of projections 42 can be changed as appropriate depending on a desired load carrying capacity insofar as projection 42 is provided at a location corresponding to an external terminal.

Although the embodiments of the present disclosure have been described, it should be considered that the embodiments disclosed herein are illustrative and non-restrictive in every respect. The scope of the present disclosure is defined by the terms of the claims, and is intended to include any modifications within the scope and meaning equivalent to the terms of the claims.

What is claimed is:

1. A power storage device comprising:
   a plurality of power storage cells that each include an external terminal and are aligned in an alignment direction;
   an accommodation case that includes an upper case and a lower case and accommodates the plurality of power storage cells;
   a bus bar module that electrically connects the plurality of power storage cells together; and
   a cover that is disposed between the upper case and the bus bar module such that a portion of the upper case can abut thereon,
   the plurality of power storage cells being fixed to the lower case,
   the bus bar module including a plurality of bus bars that connect the external terminals of the power storage cells adjacent to one another in the alignment direction,
   the cover including a facing portion that faces the plurality of bus bars,
   the facing portion being provided with a projection that abuts on the bus bar, wherein:
   the bus bar has a welded portion welded to the external terminal,
   uthe projection abuts on the bus bar away from the welded portion,
   the bus bar includes a plate-shaped portion that has a first surface and a second surface in a relationship with one serving as a front surface and the other serving as a back surface, and that is placed on the external terminal,
   the second surface is placed on the external terminal and the first surface faces away from the external terminal,
   the first surface has a recess recessed toward the second surface,
   the recess has a bottom portion provided with the welded portion,
   the projection has a flat surface portion that comes into contact with the first surface, and
   the flat surface portion is in contact with the first surface such that the flat surface portion straddles the recess to avoid coming into contact with the welded portion.

2. The power storage device according to claim 1, wherein the cover includes an upper surface portion that faces away from the bus bar and allows the portion of the upper case to abut thereon, and
the upper surface portion is flat.

* * * * *